United States Patent [19]

Thornhill

[11] 4,095,822

[45] Jun. 20, 1978

[54] SUSPENSION MEANS

[76] Inventor: Frank Warburton Thornhill, 66 Auburn Road, Kingston, Tasmania 7150, Australia

[21] Appl. No.: 726,313

[22] Filed: Sep. 24, 1976

[30] Foreign Application Priority Data

Sep. 25, 1975 Australia .............................. PC3335

[51] Int. Cl.[2] .............................................. B60G 9/00
[52] U.S. Cl. .................................... 280/702; 280/104
[58] Field of Search ................... 280/709, 112 A, 6 H, 280/104, 702

[56] References Cited

U.S. PATENT DOCUMENTS 3,563,566  2/1971  Weber ................................. 280/702

3,752,497  8/1973  Enke .................................... 280/702

Primary Examiner—Philip Goodman
Attorney, Agent, or Firm—Ladas, Parry, Von Gehr, Goldsmith & Deschamps

[57] ABSTRACT

Suspension apparatus, particularly for use with motor vehicles, utilizing a pair of pistons. The upper ends of the piston rods are connected one to either side of the underbody of the vehicle. Each piston is displaceable within its respective fluid containing cylinder. The upper and lower chambers of one cylinder are respectively connected by fluid lines to the lower and upper chambers of the other cylinder. Each fluid line is connected by an auxiliary line through a separate metering valve to separate hydraulic accumulators.

1 Claim, 1 Drawing Figure

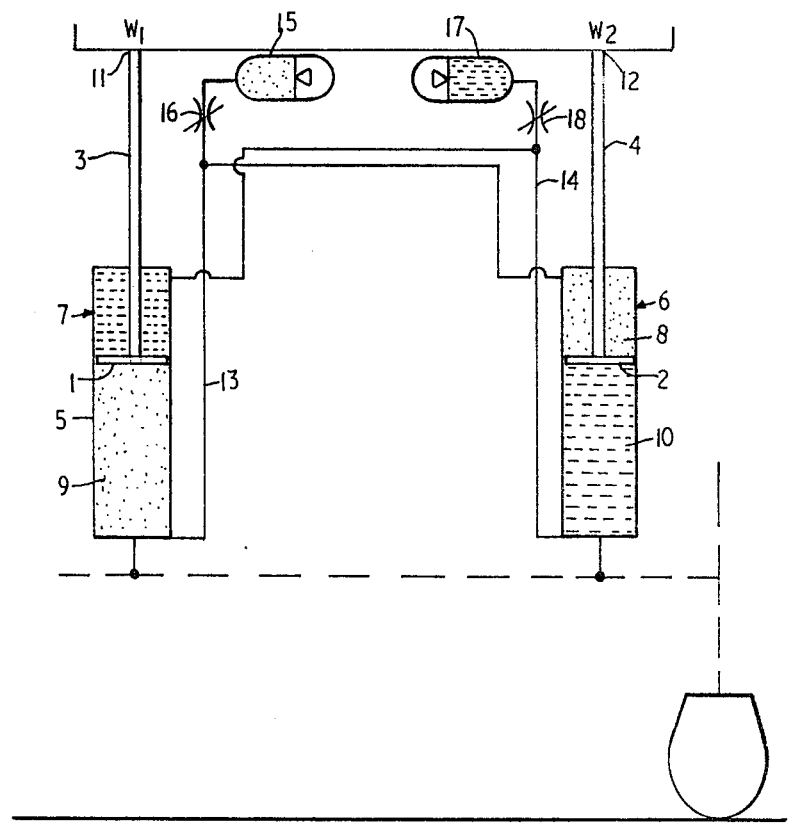

SUSPENSION MEANS

This invention relates to suspension apparatus, particularly to lateral suspension apparatus adapted for use in motor vehicles and in any other mobile units which have tendencies to roll when cornering. Such other mobile units include, for example, armchairs and wheelchairs.

In conventional semi-elliptical or coil spring suspensions used on vehicles, a cornering problem exists in that body roll due to lateral transfer of the centre of gravity of the vehicle is not readily contained.

Stabilising devices such as shock absorbers are necessary to change the spring rate but as centrifugal force increases, the outer springs tend towards full deflection whilst the inner springs become extended until a state of roll-over instability arises.

it is an object of this invention to provide suspension apparatus adapted to automatically increase the laden spring rating and to limit the more lightly laden spring extension, during cornering. Such suspension apparatus will effectively limit body roll and the movement of the centre of gravity of the vehicle towards the laden side of the vehicle, thus greatly improving cornering stability.

Consequently this invention in one broad form provides suspension apparatus comprising first and second pistons displaceable within first and second cylinders respectively, each piston having a rod and dividing respective cylinders into upper and lower chambers, either said piston rods or said cylinders being adapted for connection to a body to be stabilised, and fluid communicating lines between the upper chamber of said first cylinder and the lower chamber of said second cylinder and between the upper chamber of said second cylinder and the lower chamber of said first cylinder.

It will be clear to the man skilled in the art that a compressible fluid, such as an air-oil mixture may be used in the apparatus of this invention, but it is preferred that oil be the fluid in conjunction with an inert gas such as nitrogen.

In one form of apparatus according to this invention each of the fluid communicating lines referred to above is connected between appropriate cylinders with a pair of auxiliary lines connected one each to respective fluid communicating lines, each auxiliary line being connected through an adjustable metering valve to an hydraulic accumulator.

It is clear that in appropriate applications, more than one cylinder per accumulator may be used. Such an application would be, for example, where apparatus according to this invention was utilized in suspension of a twin axle vehicle.

Further, use of adjustable metering valves as suggested above is not essential to this invention but is merely a feature of one form thereof. In certain applications a pair of orifices may be utilized instead of the suggested metering valves.

A preferred form of apparatus according to this invention will now be described with reference to the accompanying drawing. Pistons 1 and 2 having rods 3 and 4 divide cylinders 5 and 6 respectively into upper chambers 7 and 8 and lower chamber 9 and 10. Pistons 1 and 2 are connected at 11 and 12 to the body, such as the chassis of a motor vehicle, to be supported. Fluid communication lines 13 and 14 join, respectively, the upper chamber 8 of cylinder 6 with the lower chamber 9 of cylinder 5 and the upper chamber 7 of cylinder 5 with the lower chamber 10 of cylinder 6.

Fluid line 13 is provided with inert gas hydraulic accumulator 15 and adjustable metering valve 16, whereas fluid line 14 is provided with gas hydraulic accumulator 17 and adjustable metering valve 18.

In practice, let us assume masses of $W_1$ and $W_2$ acting on rods 3 and 4 respectively creating pressures of $P_1$ and $P_2$ in lower chambers 9 and 10 respectively.

Clearly, when $$W_1 = W_2, P_1 = P_2 = W/A \text{ or } W/(A_2 - A_1),$$

where $A_1$ = piston annulus area and $A_2$ = total piston area.

Should the centre of gravity be moved laterally due to any cause such as terrain, uneven loading, or centrifugal force to the right as depicted in the drawing; then $W_2$ will exceed $W_1$ and piston 2 will be forced downwards in cylinder 6. Fluid under increased pressure will flow from chamber 10 through fluid line 14 to hydraulic accumulator 17, further compressing the inert gas. As fluid line 14 is also connected to chamber 7 of cylinder 5, pressure acting in this annulus will increase.

However, the reduction in mass of $W_1$ remains greater than the increased downward thrust due to the pressure change in chamber 7 and piston 1 will move up slightly.

Referring to chamber 9 of cylinder 5 and 8 of cyliner 6, both have increased in volume, allowing flow through line 13 from accumulator 15. Thus the pressure in this system is reduced until equalibrium is attained.

It is to be noted that only minimal movement of the pistons occurs due to the low value of the pressure changes. The rate of the suspension is dependent on the selection of the components and the restriction to flow through valves 16 and 18. the accumulators act as energy absorbers.

By induction, it appears that the mathematical relationship between integers in the system, when $W_2$ exceeds $W_1$, may be expressed by the formula $$P_2 - P_1 = (W_2 - W_1)/(A_1 + A_2).$$

Thus, if cylinders of 3½ inch inner diameter are used with pistons having rods of 2 inch outer diameter and $W_1 = W_2 = 500$ lbs, Then $P_1 = P_2 = 159$ p.s.i.

Now if $W_1 = 250$ lbs and $W_2 = 750$ lbs $$P_2 - P_1 = \frac{750 - 250}{\frac{\pi}{4}(8\frac{1}{4} + 12\frac{1}{4})}$$
$$= \frac{500}{16.1}$$
$$= 31 \text{ p.s.i.}$$

and $P_1 = 143.6$ (approx), $P_2 = 174.7$ (approx).

Hence a 50% increase in mass $W_2$ effects a mere 10% increase in pressure $P_2$.

The transfer of oil between the cylinders and the accumulators is minimal and the rate may be varied by means of valves 16 and 18. Tube sizes of small bore are adequate. The stroke of both piston rods is less than 0.1 inches in the above example. No external power source, such as a pump, is required. The hydraulic components specified have a safety factor greater than 10 to 1.

What I claim is:

1. Suspension apparatus comprising first and second pistons displaceable within first and second cylinders respectively, each piston having a rod and dividing respective cylinders into upper and lower chambers, either said piston rods or said cylinders being adapted for connection to a body to be stabilized, and fluid communicating lines between the upper chamber of said first cylinder and the lower chamber of said second cylinder and between the upper chamber of said second cylinder and the lower chamber of said first cylinder and wherein each of said fluid communicating lines is provided with an auxiliary line connected in turn through respective adjustable metering valves to respective hydraulic accumulators.

* * * * *